United States Patent [19]

Bush

[11] 4,124,282
[45] Nov. 7, 1978

[54] OPHTHALMIC LENSES

[76] Inventor: Sydney J. Bush, 37 Westella Rd., Kirkella, Hull, England

[21] Appl. No.: 694,924

[22] Filed: Jun. 11, 1976

[30] Foreign Application Priority Data

| Jun. 13, 1975 | [GB] | United Kingdom | 25448/75 |
| Feb. 11, 1976 | [GB] | United Kingdom | 5476/76 |
| Feb. 23, 1976 | [GB] | United Kingdom | 7106/76 |
| Feb. 24, 1976 | [GB] | United Kingdom | 7309/76 |

[51] Int. Cl.² .............................................. G02C 7/06
[52] U.S. Cl. ..................................................... 351/168
[58] Field of Search ................................ 351/168, 170

[56] References Cited

FOREIGN PATENT DOCUMENTS 204,803  8/1959  Austria ..................................... 351/168

OTHER PUBLICATIONS

John E. Archer, "Evaluation and Application . . ." *Optometric Weekly*, vol. 47, No. 46, Nov. 15, 1956, pp. 2066-2067.
Henry A. Knoll, "The Optical Characteristics . . .," *Amer. J. Optom. & Archives . . .*, vol. 39, No. 10, Oct. 1962, pp. 538-542.

*Primary Examiner*—Paul A. Sacher
*Attorney, Agent, or Firm*—Toren, McGeady and Stanger

[57] ABSTRACT

An ophthalmic lens for providing correction of distortion of the vertical position of an image in a lens prescribed for the condition of anisometropia comprises upper and lower portions having different optical centers. The lens surfaces of the upper and lower portions merge in a transverse band providing a smooth transition between the upper and lower lens surfaces over a vertical distance for example of 2 - 8 mm. The transverse band removes the conventional sharply visible boundary between the upper and lower lens surfaces and by introducing aberration into the lens at this point deters effective use of the lens over an angle of vision corresponding substantially to the angle of a cone of light entering the pupil of the eye and so prevents double vision occurring at the boundary of the lens surfaces. Methods of production of the lens are also disclosed.

3 Claims, 26 Drawing Figures

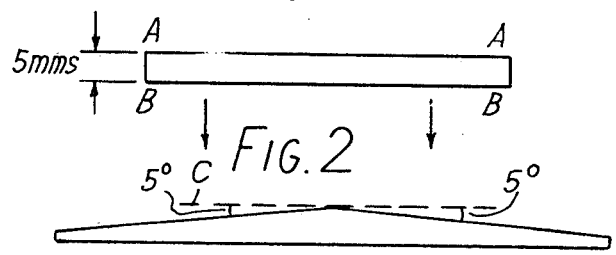
FIG. 1
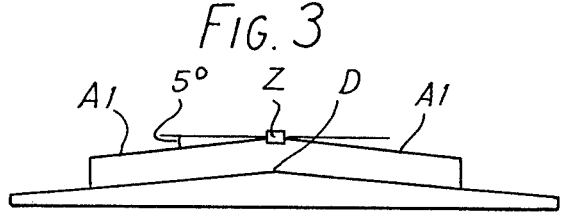
FIG. 2
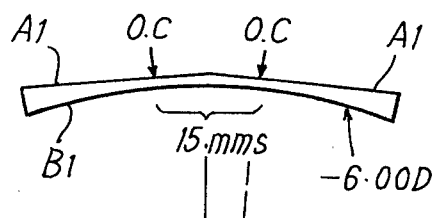
FIG. 3
FIG. 4

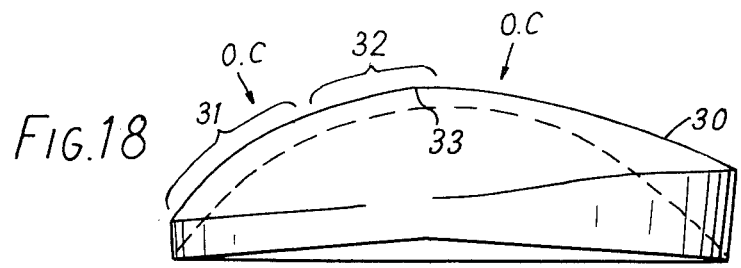
Fig. 18
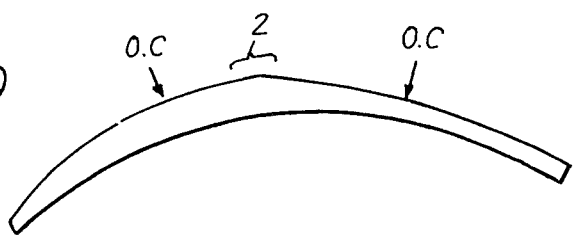
Fig. 19
Fig. 20
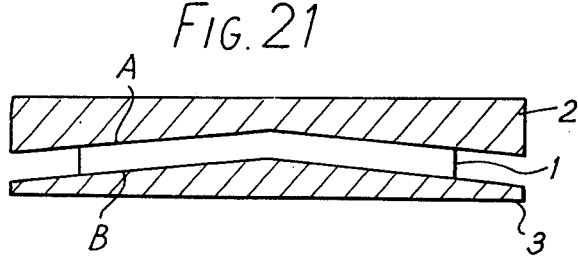
Fig. 21
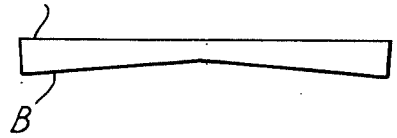
Fig. 22
Fig. 23

OPHTHALMIC LENSES

BACKGROUND OF THE INVENTION

1. Field of the Invention

This invention relates to ophthalmic lenses and their production.

2. Description of the Prior Art

It is well known in the prescription of ophthalmic lenses that, in cases of anisometropia where the patients's eyes require different degrees of focal correction, there is a danger of producing the effect of double vision. This occurs when an object is viewed through the upper or lower parts of the unequal lenses, above or below the optical centers of the lenses, where the stronger lens will distort the vertical position of the object to a greater degree than a weaker lens. This disadvantage can be minimized by producing one or both lenses with upper and lower lens surfaces having different optical centers. In this way, the prismatic differences between right and left-hand lenses can be reduced, providing upper and lower angles of view with minimum displacement, in the upper and lower regions of the lenses respectively. However, such lenses have the disadvantage that they are traversed by unsightly horizontal lines where the upper and lower regions of the lenses meet, and that, at least when produced in glass, extensive accurate grinding by the so-called "slab-off" technique is involved which renders the finished lenses very expensive and not readily available as few people have the skill and capacity to make them. Moreover, in the case of deep minus lenses glass blanks of sufficient thickness for "slab-off" grinding are not readily available.

The presence of the horizontal lines in such lenses having two optical centers, hereinafter referred to as bicentric lenses, renders the lenses cosmetically unacceptable, since patients requiring right and left lenses of unequal power are often already conscious of their apparent uneqal eye size, and the presence in addition of unsightly horizontal lines in their lenses is a further embarrassment. In addition, the known bicentric lenses have the disadvantage that the sharp horizontal dividing line which separates the upper and lower sufaces of the lens has itself the effect of causing interference and double vision.

SUMMARY OF THE INVENTION

It is an object of the present invention to provide an ophthalmic lens in which upper and lower lens surfaces having different optical centers are spaced apart by a transverse band within which aberration is introduced into the lens in order to provide a smooth and inconspicuous transition between the lens surface whilst at the same time preventing double vision occurring at the boundary between the lens surfaces.

A lens according to the invention has the advantage that it is cosmetically acceptable since it does not present unsightly horizontal lines when worn, and has the surprising further advantage that it improves the vision of the wearer, since, despite the fact that the said transverse band introduces aberration into the lens and is incapable of providing correction of the visual acuity of the wearer, the distortion of vision introduced by said band is preferably to the double vision occurring at the junction between upper and lower lens surfaces of a conventional bicentric lens, helping to reduce the discontinuity of perceived field in the vertical plane which is a concomitant of the conventional lens.

Preferably, the said transverse band is in the range of 2 - 8 mms in vertical dimension being varied according to the amount of prismatic imbalance to be treated.

A bicentric lens in accordance with the invention may be produced by a variety of methods. For example, starting with a known bicentric lens, for example a rejoined lens with or without near vision decentration, presenting the sharp horizontal dividing line, this line may simply be polished away over a zone of the required vertical dimension. Alternatively, moulded synthetic plastics lenses of the required shape may be prepared simply by appropriate modification of the shape of known moulds.

According to a preferred feature of the invention, however, such a lens may be produced by providing a lens blank with an optically finished surface, and then bending the lens blank to introduce the required prismatic effect into said lens surface, the bending of the lens being so controlled as to produce in said optically finished surface the required transverse band.

Thus in accordance with one embodiment of the invention bending of said lens blank is effected by placing the surface of the blank opposite said optically finished surface on a former and heating at least that portion of the lens blank to be bent to such a degree that said portion becomes plastic whereby the blank deforms either under its own weight or with mechanical assistance to conform to said former, the said opposite face of the lens blank and/or the former being so shaped as to introduce the required prismatic effect into the finished lens.

Subsequently the said opposite face of the lens blank may be finished by grinding and polishing to produce the finished lens, or alternatively the said optically finished surface may be used as a mould surface for the production of further lenses. In the case of plus magnifying lenses this gives a good casting or moulding surfaces for plastics lenses.

In either case it will be noted that it is only necessary for the opposite surface of the finished lens to have a single center of curvature, or possibly, if the initial optically finished surface was curved, to be flat, for the lens to have two distinct optical centers one on each side of an axis corresponding to the axis of bending of the lens blank.

Thus it will be seen that the grinding and polishing operations required to produce such a bicentric lens are substantially simplified.

The bending of the lens blank coupled with the grinding of the said opposite surface introduces a prismatic effect into the finished lens and has the result, when the initial optically finished surface is curved, of relocating the centers of curvature of the portions of the lens defined by the axis of bending. If desired, the said opposite surface of the initial lens blank by itself incorporate such a prismatic effect in order to reduce the grinding required to finish the said opposite surface of the lens, in which case the former may be flat or of shallower angle than otherwise required. There are also special cases where it is preferable that the aberration is not exactly mid-way between the optical centers.

The precise location of the optical centers of the finished lens is determined as a function of (1) the angle of bending of the lens blank, (2) the radius of curvature of the initial optically finished surface, (3) the radius of curvature imparted to the opposite surface of the lens as determined by (a) the prism applied overall during the last grinding/polishing step, or (b) the prism inherent in the lens blank and confirmed by the last grinding/polishing step, and (4) the finished thickness.

It is emphasized that whilst in most cases two distinct optical centers are imparted by this method, in some cases the actual centers may not be observable, merely the prismatic effects.

The heating of the lens blank may be effected by local heating of the blank along the axis of bending, for example by a flame applied through a slit in the surface of the former, by hot air, by a hot wire, by optical means or radio frequency radiation methods, or by overall heating of the lens blank in an oven. In the former case mechanical assistance of the bending of the lens blank is facilitated, since pressure may be applied to the unheated portions of the blank without disturbing the optically finished surface. In the latter case, in order to provide support for the lens blank during the bending thereof about said transverse axis, the said former may be so constructed that it initially conforms to the configuration of the said opposite surface of the lens blank and is itself progressively bent about said transverse axis during heating of the lens blank, in order to effect the desired bending of the latter. For this purpose the former may be divided along said transverse axis and means may be provided for moving the two parts of the former relatively to one another during heating of the lens blank, until the former reaches the desired final configuration of the said opposite surface of the lens blank.

If desired, bending of the lens blank may be assisted by providing the blank with a transverse line of weakness, for example by providing a saw cut across the unfinished surface of the lens blank.

According to an alternative embodiment of the invention, said blank is formed of a material possessing the property of so-called "plastic memory" and bending of said lens blank is effected by initially bending the blank under the influence of heat and cooling it, before provision of said optically finished surface, and then, after provision of said optically finished surface, reheating said blank whereby under the influence of inherent plastic memory the said optically finished surface is re-bent.

The method according to this embodiment of the invention has the advantage that since the restoration of the blank from its initially deformed state to its state of equilibrium is determined by the plastic memory inherent in the blank itself, the modification of the optically finished surface provided on the blank can be controlled in advance by imparting a given configuration to the blank during the initial deformation step. Moreover since, during the latter step the blank does not have any optically finished surface, the initial deformation of the blank can be precisely controlled by pressing between shaped formers without regard for the surface finish of the blank. The re-bending of the blank under "plastic memory" may, if desired, be mechanically assisted for greater accuracy.

It will be appreciated that a blank provided with an optically finished lens surface in accordance with the invention may serve itself as a partly prepared blank for the production of a finished lens, or alternatively that the optically finished surface thereof may serve as a mould surface from which moulded lenses may be produced.

BRIEF DESCRIPTION OF THE DRAWINGS

FIGS. 1 to 4 illustrate steps in one method for producing an ophthalmic lens in accordance with the invention, FIGS. 13 to 19 are diagrammatic views illustrating the production of further embodiments of ophthalmic lens in accordance with the invention, and FIGS. 20 to 23 illustrate steps in a further method for producing an ophthalmic lens in accordance with the invention.

DESCRIPTION OF PREFERRED EMBODIMENTS OF THE INVENTION

Figure 5:
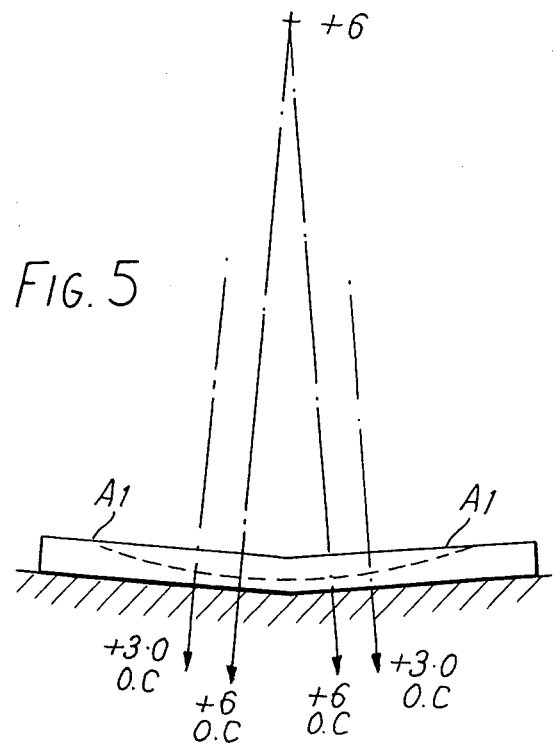
FIG. 5 illustrates a modification of the method shown in FIGS. 1 to 4, FIGS. 6 and 7 illustrate steps in a further method for producing an ophthalmic lens in accordance with the invention.

Referring to the drawings, FIGS. 1 to 4 illustrate the production of a $-6$ dioptre plano meniscus bicentric lens in accordance with the invention, starting from a more or less parallel sided lens blank of 6 cm. diameter and 5 mm. thickness. A plane sided lens blank illustrated in FIG. 1 has one surface A optically finished, the other surface B being semi-finished or possibly rough. The blank is placed with the surface B on a refractory former of vitreous carborundum, as shown in FIG. 2, the former being shaped to provide two flat surfaces each angled at 5° out of the plane indicated at C in broken lines. The blank and the former are heated in an oven to cause sagging of the blank to conform to the former as shown in FIG. 3, so that the blank then comprises two optically finished plane surfaces A1 angularly displaced relatively to one another about a transverse axis D by a total angle of 10°. Owing to the plastic deformation of the blank as it conforms to the central ridge of the former, the two surfaces A1 do not meet in a sharp dividing line, but are separated by a zone Z which comprises a linear plano/cylindrical surface of which the radii of curvature are determined partly by the thickness of the blank, the width of the cylindrical zone Z being variable in the range of approximately 5 - 10 mms.

The blank formed to the shape shown in FIG. 3 may now be used to produce a finished lens by grinding the surface B to provide a lens of the required power. For example, as shown in FIG. 4 the surface B is ground to a $-6$ dioptre curve, in which case the final lens will have two distinct optical centers indicated in OC, and spaced apart from one another by 15 mms. The positions of the optical centers are determined by the points at which tangents to the lens curve become parallel to the planar front surfaces, and thus the spacing of the two optical centers will be determined by the power of the lens surface ground.

The lens shown in FIG. 4 provides an ophthalmic lens of negative power, of which the surfaces A1 form planar front surfaces of the lens, the surface B1 forming the rear surface.

It will be appreciated that in order to produce a lens of positive power from a plane sided blank, the method illustrated in FIGS. 1 to 4 may be modified by replacing the former shown in FIG. 2 by means of a former as shown in FIG. 5, so that the optically finished surface A is angled in the reverse direction. The resulting two planar surfaces A1 then form the back surface of the final lens, and the front surface B may be ground to a positive curvature, as indicated in FIG. 5 in broken lines, to provide a front lens surface of the required power. The front surface may for example be ground to a power of +6 dioptres, in which case the spacing of the optical centers in 14 mm., or to a power of +3 dioptres in which case the spacing of the optical centers is 28 mm., assuming that the angle between the two rear surfaces A1 is 10°.

In either of the methods described above, the initial optically finished plano surface A is formed into two angled upper and lower plane surfaces A1 which form the front or rear surface of the ophthalmic lens as the case may be, and which are separated by a band in accordance with the invention defining a linear plano-/cylindrical surface approximately 3 - 8 mms. in thickness in the vertical plane. The surface A thus has a relatively small effect on the optical power of the final lens, this being determined by its more or less zero power combined with the curvature ground on the surface B of the lens. If desired, however, the surface A may initially be ground to a positive or negative curvature, so that when the blank is deformed to cause the surface B to conform to the configuration of the former, two distinct curved surfaces A1 are formed, and the desired optical characteristics of the lens can be derived from a combination of the refractive powers of both the front and rear surfaces of the lens.

Figure 6:
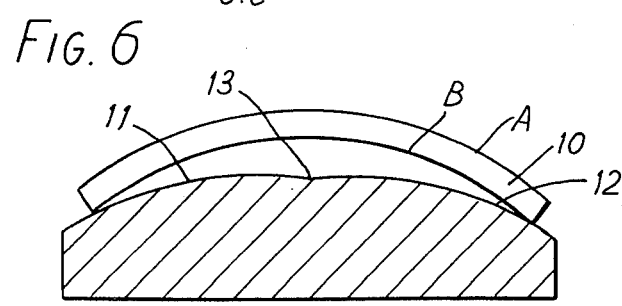
Figure 7:
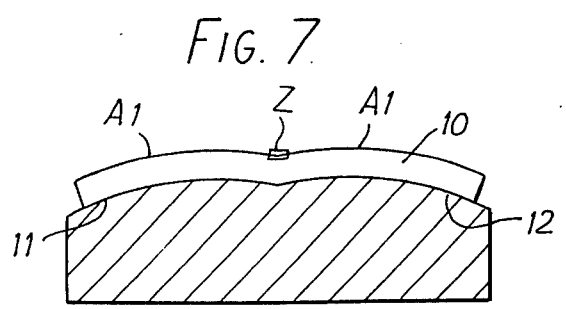
Figure 11A:
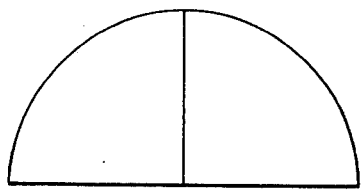
Figure 11B:
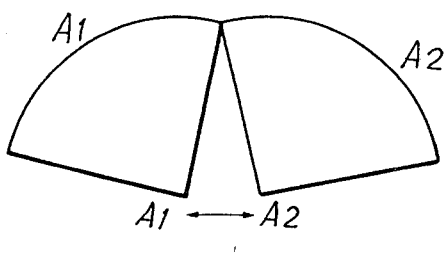
Figure 12A:
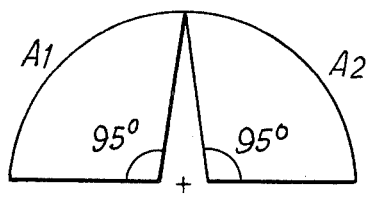
Figure 12B:
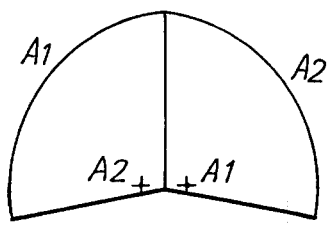
Figure 11C:
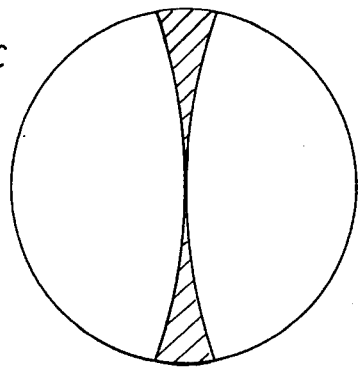

Referring to FIGS. 6 and 7, there is shown a further method in accordance with the invention applicable to a lens blank of curved configuration. As shown in FIG. 6, a lens blank 10 having a curved configuration to provide front and rear surfaces A and B of the same, for example 6 dioptre, curvature is arranged on a former having two areas 11 and 12 each having a curvature the same as that of the lens blank, but having their centers of curvature spaced apart from one another so that the two regions of curvature meet in a distinct dividing line 13 extending transversely across the former. Such a former may be conveniently provided by transversely dividing a conventional 6 dioptre lap and remounting the two halves at an angle to one another, as shown diagrammatically in FIGS. 11A - 11C for a lens of positive power and in FIGS. 12A and 12B for a lens of negative power, or by dividing the two laps and putting the greater or lesser parts together.

As shown in FIG. 7, when the blank 10 is heated so that it sags and conforms to the surfaces 11 and 12 of the former, the front curved surface A is divided into two surfaces A1 each retaining their original +6 dioptre curvature, the two surfaces A1 meeting in a transversely extending zone Z in which the lens surface is deformed cylindrically/torically during sagging thereof. When the rear surface B of the lens blank is finished by grinding, for example to a curvature of −3 dioptres, the resulting lens will have a power of +3 dioptres and two distinct optical centers spaced apart by a distance determined by the angle of bending of the lens blank.

It will be appreciated that the optical surface formed by the two areas A1 of a lens blank formed as described above may be employed for the production of plastics lenses, in which case the surface(s) A1 simply form a mould for imparting a corresponding curvature to the plastics lens. Since, in this case, the initial glass blank will not need to have the opposite face B ground to a finished curvature, the initial glass blank may be substantially thinner than if it were itself to be used as a lens, and may in fact remain in place on the initial former so that the latter acts as a support therefor during moulding of the plastics lenses. Owing to the fact that a thinner glass blank may be used in such a case, it will be appreciated that the dimensions of the zone Z may be reduced by an amount corresponding to the reduction in the thickness of the glass blank. This is not desirable however for larger primatic corrections.

Figure 8:
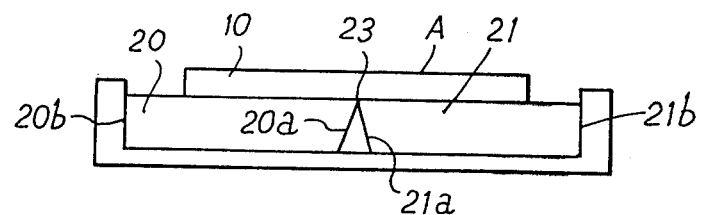
FIGS. 8, 9 and 10 are diagrammatic views of an apparatus for use in the method shown in FIGS. 1 to 4, FIGS. 11a to 11C and 12A to 12B are respectively diagrammatic views illustrating the production of formers for use in a method in accordance with the invention.
Figure 9:
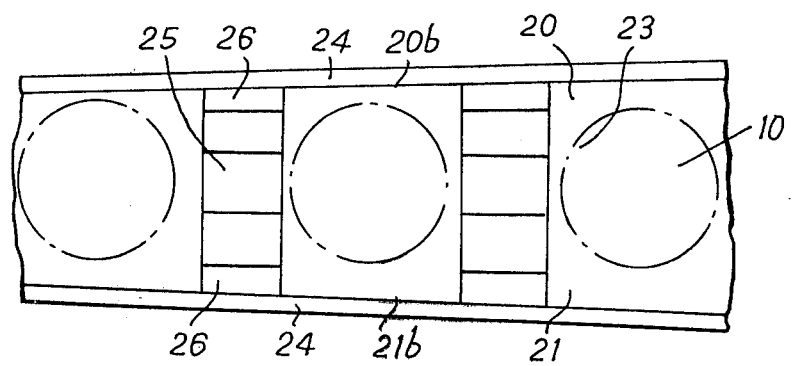
Figure 10:
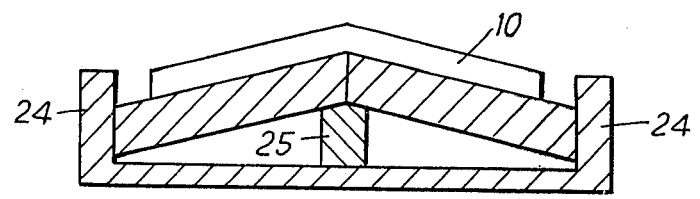

Referring to FIGS. 8 to 10 of the drawings, there is shown a modification applicable to any of the methods described above, whereby the glass blank to be bent about a transverse axis is allowed to remain substantially fully in contact with the former during deformation of the lens blank. This enables the lens blank to be bent with reduced deformation thereof as a result of sagging of unsupported areas of the lens blank. As shown in FIG. 8 a former is formed in two portions 20 and 21 which meet along a transverse dividing line 23 and have contacting bevelled edges 20a and 21a. As shown in FIG. 9, a plurality of such formers are guided through a heating oven not shown, by being advanced in this particular case longitudinally between a pair of converging guide rails or ledges 24. The converging guide rails 24 urge together the opposite free edges 20b and 21b of the two portions of the former, causing the meeting edges of the two halves of the former to be urged upwardly in a progressive manner until the two bevelled edges 20a and 21a meet one another to define the desired angle of deformation of the lens blank, as shown in FIG. 10. Suitable guide means may be provided below the former as shown at 25 in order to control the upward movement of the two halves of the former. Preferably successive formers are spaced apart along the longitudinal axes of the guide rails 24 by spacer means 26 which may incorporate suitable anti-friction means such as roller bearings, in order to assist passage of the formers along the rails 24.

It will be appreciated that the arrangement shown may be adapted to produce a contrary movement of the former for the production of plus lenses as shown in FIG. 5. It may also be applied to formers as shown in FIGS. 11 and 12.

Although the methods described above relate to the production of lenses of uniform power, it will be appreciated that similar methods may be adopted for the production of bicentric multi-focal or variable focus lenses, there being very considerable need in cases of anisometropia to provide variable focus lenses of differing powers between right and left eyes with prismatic compensation for the inherent prismatic imbalance consequent on the required use of upper and lower (reading) portions of these lenses.

In the case of variable focus lenses, for example, the method described above may be applied by modifying a former of known type shaped to provide the required varying radii of curvature of the variable focus lens.

Figure 13:
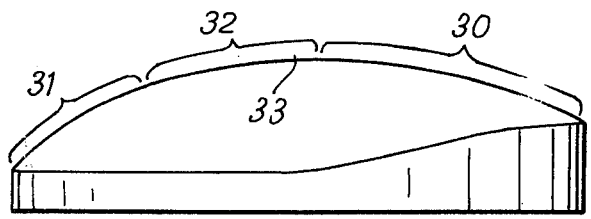
Figure 14:
Figure 15:
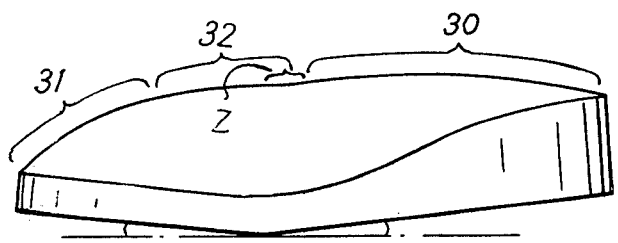
Figure 16:
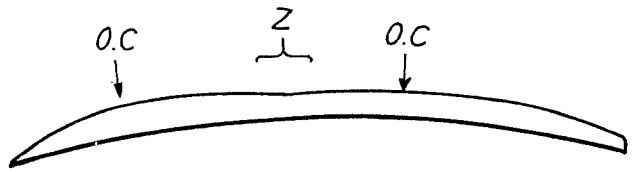
Figure 17:
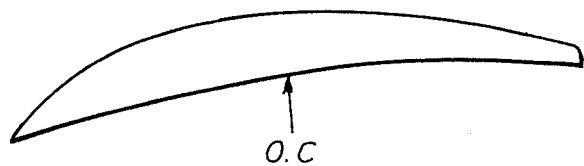

Referring to FIG. 13, there is shown a former of known type which comprises a zone 30 of constant radius of curvature, a zone 31 of constant, smaller radius of curvature, and a zone 32 in which the radius of curvature progressively diminishes between the two zones 30 and 31. By bending such a former at the region 33, in order to produce a former having the shape shown in FIG. 14, a lens having the shape shown in FIG. 15 may be produced. When the unfinished surface of such a lens is then ground to a finished state as described above, the resulting lens will appear as shown in FIG. 16, in which the lens is shown to have two distinct optical centers OC, each preferably located with a zone 30 or 31. Such a lens may be compared with the normal variable focus lens having a single optical center OC as shown in FIG. 17.

The lens shown in FIG. 16 is a lens having a positive power, but as also described above it will be appreciated that a lens having a negative power may be produced by bending the former in a reverse direction, as shown in FIG. 18, in order to produce a lens as shown in FIG. 19.

The above described methods of manufacturing an ophthalmic lens in accordance with the invention are primarily applicable to the production of lenses from lens blanks of glass. However, it will be appreciated that the bending of a lens blank to produce a ophthalmic lens in accordance with the invention may be achieved in any manner permitted by the properties of the material under consideration. For example, a method of manufacturing a lens from a material exhibiting the property of so-called "plastic memory" is illustrated in FIGS. 20 to 23.

Referring to FIG. 20 of the drawings, there is shown a plane sided lens blank 1 formed of a material having the property of "plastic memory. " This property is well known to those skilled in the art of thermo-forming of plastics materials, and it will be readily appreciated that there are generally available thermoplastics materials which possess this property and are also optically suitable for the production of lenses. In a first step in a method in accordance with the invention, the blank 1 is heated sufficiently to render it plasticably deformable, and is then pressed between two shaped platens 2 and 3, so that the two surfaces A and B of the lens blank 1 are angled about a transverse axis as shown. The lens blank 1 is then allowed to cool so that it is set in the deformed shape. After removal of the cooled blank 1 from the platens, the surface A may be ground flat and polished to provide an optically finished surface, whereupon the blank has the shape as shown in FIG. 22. When the blank is subsequently heated again to a temperature at which it is plastically deformable, owing to the inherent "plastic memory" possessed by the blank it will return to a condition in which the molecular structure of the material is in equilibrium, and thus will tend to readopt the shape as shown in FIG. 20. However, owing to the removal of material from the surface A of the original blank, the surface A' shown in FIG. 3 will assume the contour as shown at A" in FIG. 4, and thus the now optically finished surface of the lens will acquire in reverse angle which imparts a prismatic property to the lens blank. By now finishing the surface B of the lens blank to form a convex lens surface thereon, as shown in broken lines, a planomeniscus lens of positive power and having two distinct optical centers may be formed. As in the case of the lenses described above, the two angled plane surfaces A' of the lens formed will be separated by a plano/cylindrical surface defining a transverse band as described above, the radii of curvature and the vertical width of the band being determined by the properties of the material forming the blank 1, and the initial shape of the platens 2 and 3. Since a material possessing "plastic memory" does not always fully return to its initial unbent state, it may sometimes be necessary to apply external force to the blank 1 in order to assist the restoration of the blank to its initial condition, and this will tend to increase the tendency to the formation of the required cylindrical zone separating the plano surfaces. However, if desired, the platens 2 and 3 may be initially formed with radiused edges at the ridge separating their angled surfaces, in order to ensure the formation of a cylindrical band of the required width in the final lens.

It will be appreciated that the process shown in FIGS. 1 to 4 may be adapted for the production of a lens of negative power by grinding and polishing the surface B of the blank as shown in FIG. 2 to provide an optically finished flat surface, and then, after reheating the blank, finishing the surface A to provide a concave lens surface. In this case, the initial blank would need to be of greater thickness to provide for removal of sufficient material to form the finished lens.

What is claimed is:

1. An ophthalmic lens comprising upper and lower lens portions which respectively comprise upper and lower lens surfaces which are angularly displaced relative to one another about a horizontal axis so that the optical centers of said lens portions are correspondingly vertically displaced and the lens exhibits a prismatic effect, said upper and lower lens surfaces being joined by a transverse band providing a smooth transition between them, said band having a vertical dimension greater than 3 mm.

2. A lens according to claim 2, wherein said upper and lower lens surfaces are plane surfaces arranged at an angle of 10° relative to one another, and said surfaces being joined by a plano-cylindrical surface having a vertical dimension within the range of 5–10 mm.

3. A lens according to claim 1, wherein the vertical dimension of said transverse band is less than 8 mm.

* * * * *